United States Patent [19]
Lee

[11] 4,362,769
[45] Dec. 7, 1982

[54] METHOD OF NEUTRALIZING THE CORROSIVE SURFACE OF AMINE-CURED EPOXY RESINS

[75] Inventor: Sheng Y. Lee, Silver Spring, Md.

[73] Assignee: The United States of America as represented by the Administrator of the National Aeronautics and Space Administration, Washington, D.C.

[21] Appl. No.: 293,412

[22] Filed: Aug. 14, 1981

[51] Int. Cl.$^3$ ............................................. B05D 3/00
[52] U.S. Cl. ................................ 427/322; 427/340; 427/352; 427/400; 427/407.1
[58] Field of Search ............... 528/73, 109, 121, 123, 528/119; 427/336, 337, 340, 352, 399, 400, 393.5, 407.1, 385.5, 322

[56] References Cited

U.S. PATENT DOCUMENTS

| | | | |
|---|---|---|---|
| 3,361,715 | 1/1968 | Vogt et al. | 528/121 |
| 3,377,308 | 4/1968 | Oertel et al. | 260/32.6 |
| 3,407,175 | 10/1968 | Presley et al. | 260/47 |
| 3,525,779 | 8/1970 | Hawkins | 260/830 |
| 3,558,422 | 1/1971 | Hamilton et al. | 161/185 |
| 3,715,326 | 2/1973 | Traubel et al. | 260/2.5 AY |
| 4,009,113 | 2/1977 | Green et al. | 252/95 |
| 4,085,161 | 4/1978 | Sekmakas et.al. | 260/837 R |
| 4,260,727 | 4/1981 | Floyd | 528/73 X |

*Primary Examiner*—Thurman K. Page
*Attorney, Agent, or Firm*—Ronald F. Sandler; John R. Manning

[57] ABSTRACT

The corrosive alkaline surface layer of an epoxy resin product formed by the curing of the epoxy with an aliphatic amine is eliminated by first applying a non-solvent to remove most or all of the free unreacted amine and then applying a layer of a chemical reagent to neutralize the unused amine or amine functional groups by forming a substituted urea. The surface then may be rinsed with acetone and then with alcohol. The non-solvent may be an alcohol. The neutralizing chemical reagent is a mono-isocyanate or a mono-isothiocyanate. Preferred is an aromatic mono-isocyanate such as phenyl isocyanate, nitrophenyl isocyanate and naplthyl isocyanate.

8 Claims, No Drawings

METHOD OF NEUTRALIZING THE CORROSIVE SURFACE OF AMINE-CURED EPOXY RESINS

ORIGIN OF THE INVENTION

The invention described herein was made by an employee of the United States Government and may be manufactured and used by or for the Government for governmental purposes without the payment of any royalties thereon or therefor.

TECHNICAL FIELD

The invention relates generally to a process for eliminating the corrosive surface of amine-cured epoxy resins, and more particularly to the elimination of the corrosive alkaline surface which is frequently formed when amines are used to cure epoxy resins.

BACKGROUND ART

There are many applications where it is desirable to employ an amine-cured epoxy resin for bonding, coating, embedding or casting. These applications include the bonding or coating of electrical conductors, the embedding of electrical conductors in the epoxy resin or the casting of epoxy resin with an electrical conductor within. These electrical conductors are typically copper or aluminum. Under many process conditions, however, a surface is formed on the epoxy resin product which is highly corrosive to both copper and aluminum. The problem of corrosive surface formation is particularly acute when aliphatic amines are used as a curing agent. This problem has been previously recognized and determined to be due to the formation of an alkaline surface which includes unreacted amine and unused amine functional groups, either free or in the form of carbonates.

Previous efforts have been made to solve the corrosive surface problem. These efforts have included curing the amine-cured epoxy resin in a dry container at an elevated temperature but the results have not been completely satisfactory. High temperature curing does tend to leave less surface alkalinity but usually is not satisfactory. Moreover, the method may not be practicable in many situations and high temperature curing may have a deletereous effect on the epoxy resin itself because too high a peak exotherm can burn the resin itself or it may destroy any embedded electronic components.

STATEMENT OF THE INVENTION

Accordingly, an object of the present invention is to provide a new and improved process for making amine-cured epoxy resin products.

Another object of the invention is to provide a new and improved process for the elimination of unreacted amine and unused amine functional groups from the surface of amine-cured epoxy resin products.

A further object of the invention is to provide a new and improved process for the elimination of corrosive surface ingredients from amine-cured epoxy resin products.

In accordance with the invention, a process is provided for making amine-cured epoxy resins which are free from the presence of a corrosive alkaline surface layer by treating the epoxy resin surface with mono-isocyanates or mono-isothiocyanates to eliminate both the unreacted amine and the unused amine functional groups. The process is especially useful when aliphatic amines are employed for the curing process and allows curing at room temperature.

DETAILED DESCRIPTION OF THE INVENTION

Epoxy resins are frequently amine-cured. Amine-cured epoxy resins find a broad application in bonding, coating, embedding and casting. The bisphenal A type epoxies have proved very popular for use in the amine-cured process because the reaction is predictable. Representative epoxies in this group include EPON 815 and EPON 828 which are Shell Oil Company trademarked products. These epoxies are represented by the general formula:

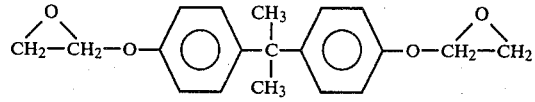

Unfortunately, when epoxy resins are amine-cured, an alkaline corrosive layer is often formed on the surface of the cured product, especially where aliphatic amines are employed. The corrosive layer includes unreacted amine and unused amine functional groups. This is particularly likely to occur when the product is cured in air whereupon the moisture and carbon dioxide in the air retard the curing reaction of amines on the surface, either by dilution effect or by the formation of amine carbonate salt. Additionally, the amine concentration in the surface layer may be inadvertently raised if the amine is relatively volatile and vacuum deaeration has been applied for an unnecessarily long period. Surface corrosiveness is particularly serious when aliphatic amines are chosen as the curing agent. The aliphatic amines may be shown by a typical formula $H_2N-R-NH-R'-NH_2$.

Typical aliphatic amines chosen for this classical reaction may be the amidoamines, marketed under the mark VERSAMID, a trademark of General Mills, Inc., diethylene triamine, marketed under the mark DETA, a trademark of the Allied Chemical Corporation, triethylene tetraamine, marketed under the mark TETA, a trademark of the Allied Chemical Corporation, m-xylylene diamine (MXDA) and 1,3-bis (aminomethyl) cyclohexane (1,3-BAC).

Aromatic amines usually present no significant problem with respect to the formation of a corrosive layer because they typically require a high temperature curing process where the humidity is low. Generally, the aromatic amines are much less hydrophilic and do not react significantly with carbon dioxide. In contradistinction, the alphatic amines are usually hydroscopic and very reactive toward carbon dioxide. This makes them very vunerable when exposed to air. It is the moisture and carbon dioxide that hinder the desired curing reaction of the aliphatic amine at the surface of the product. Nevertheless, the aliphatic amines are often the curing reagent of choice because they allow the epoxy resin to cure at room temperature and at a rapid rate. The resulting product will have a relatively high modulus of elasticity and bond strength. Room temperature curing may save cost and avoid the necessity of elevated temperature curing which may be detrimental to the embedded electronic components. Corrosiveness appears to be the only significant disadvantage of using the aliphatic amines.

The alkaline corrosive layer on the surface can not be washed away with a solvent because the amines used for curing to effect polymerization and crosslinking are polyfunctional. The amine functional groups that are exposed to air may be left unreacted while other functional groups of the same molecule may have reacted and are tied to the polymer network. The alkaline surface cannot be eliminated by using less than the stoichiometric amount of amines for the curing reaction. The corrosive surface layer may be removed by mechanical means, such as sanding or abrading, but these processes are not always practical. Curing in dry air or in an inert atmosphere, e.g. nitrogen, or adding a post-cure at an elevated temperature will reduce the surface alkalinity but frequently insufficiently.

The invention is a rapid, convenient and effective method for chemically converting all the unused amines and amine functional groups into neutral, noncorrosive substituted urea. The reaction will take place at room temperature, in a few minutes, without leaving any corrosive residues. The method is simply to treat the corrosive alkaline surface layer of the amine cured epoxy resin by applying a thin but complete, contiguous coating or layer of a chemical reagent which may be either a mono-isocyanate or a mono-isothiocyanate. The reagent may be either aromatic or aliphatic, cyclic or acyclic. Aromatic mono-isocyanates are generally preferred because aliphatic mono-isocyanates are less reactive while mono-isothiocyanates, whether aromatic or aliphatic, have an unpleasant odor. Among the substituted or unsubstituted aromatic mono-isocyanates, phenyl isocyanate, nitrophenyl isocyanate and naphthyl isocyanate are liquids, and readily available. 1-Naphthyl isocyanate is a preferred reagent because it has a low vapor pressure and its vapor is much less irritating than some of the other reagents. Nevertheless, the entire process, including the epoxy preparation, should be carried out under a fume hood. In any event, these reagents, as a class, will convert the corrosive alkaline layer of the epoxy resin product to a neutral, noncorrosive substituted urea in from one to fifteen minutes at room temperature. The reaction will work at any temperature below the boiling point of the mono-isocyanate or mono-isothiocyanate employed as the reagent.

All the cyanates used are those that will react with the unused amine or amine functional group left on the epoxy resin surface. With the mono-isocyanates, NCO is the functional group. With the mono-isothiocyanates, NCS is the functional group. The reaction may be illustrated as follows:

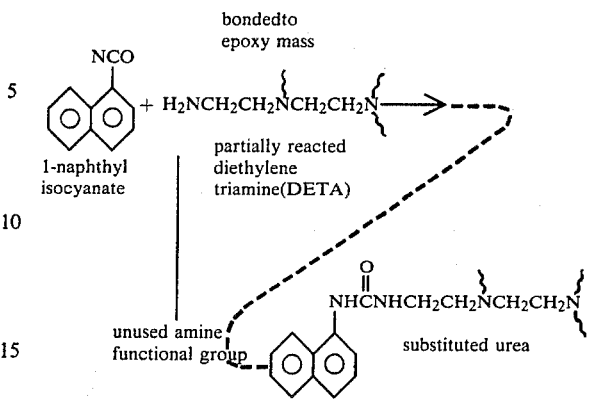

The effectiveness of the cyanate reagent treatment may be improved by pre-washing the surface to be treated with a non-solvent such as alcohol to remove, as much as possible, the free unreacted amine on the surface. Thereafter, the surface should be dried because moisture or residual alcohol may consume part of the cyanate reagent and result in incomplete neutralization. Thereafter, it is advisable to use an excess of the cyanate reagent, cover the entire surface and to brush—mix the reagent on the surface once or twice during the reagent treatment. The surface may then be rinsed, initially with acetone, and then with alcohol. It is desirable to collect the washings in a receptacle where the excess cyanate reagent will be destroyed by the alcohol. The effectiveness of the neutralization treatment may be tested simply with a piece of moistened $p^H$ paper. Before the neutralization treatment, the surface may show a $p^H$ value of from about 9 to 10. After the treatment, the $p^H$ value will be from about 7 to 8.

I claim:
1. A process for making a cured epoxy resin polymer, with a corrosion free surface area including:
    forming said polymer with a mixture of an epoxy resin prepolymer and an aliphatic amine, said aliphatic amine acting as a curing agent;
    applying a liquid layer of a mono-isocyanate or mono-isothiocyanate reagent to said surface area of said polymer; and
    rinsing said reagent from said surface area.
2. The process of claim 1 wherein said surface area of said polymer is treated with an aromatic mono-isocyanate reagent.
3. The process of claim 2 wherein said reagent is selected from the group consisting essentially of phenyl isocyanate, nitrophenyl isocyanate and naphthyl isocyanate.
4. The process of claim 2 wherein said reagent is 1-naphthyl isocyanate.
5. The process of claim 1 wherein said layer is a contiguous coating of said reagent on said surface.
6. The process of claim 1 wherein said surface area is treated with a non-solvent for said polymer and dried prior to applying said reagent.
7. The process of claim 6 wherein said non-solvent is alcohol.
8. The process of claim 1 wherein said rinsing is accomplished with acetone and then alcohol.